(12) United States Patent
Eiden, III et al.

(10) Patent No.: US 9,758,082 B2
(45) Date of Patent: Sep. 12, 2017

(54) INTERMODAL STORAGE AND TRANSPORTATION CONTAINER

(71) Applicant: Proppant Express Solutions, LLC, Denver, CO (US)

(72) Inventors: Kenneth W. Eiden, III, Bozeman, MT (US); Brian Andrew Hunter, Calgary (CA); Mathew Carley, Bozeman, MT (US); Timothy Stefan, Bozeman, MT (US); Mark D'Agostino, Bozeman, MT (US); Scott D'Agostino, Bozeman, MT (US)

(73) Assignee: Proppant Express Solutions, LLC, Denver, CO (US)

( * ) Notice: Subject to any disclaimer, the term of this patent is extended or adjusted under 35 U.S.C. 154(b) by 263 days.

(21) Appl. No.: 14/249,420

(22) Filed: Apr. 10, 2014

(65) Prior Publication Data
US 2014/0305769 A1  Oct. 16, 2014

Related U.S. Application Data

(60) Provisional application No. 61/811,493, filed on Apr. 12, 2013.

(51) Int. Cl.
*B60P 1/56* (2006.01)
*B65D 88/12* (2006.01)
(Continued)

(52) U.S. Cl.
CPC ............... *B60P 1/56* (2013.01); *B65D 88/12* (2013.01); *B65D 88/30* (2013.01); *B65D 88/32* (2013.01);
(Continued)

(58) Field of Classification Search
CPC ............ B65D 88/12; B65D 2547/04; B65D 2590/664; B65D 83/06; B60P 1/56; B65G 2814/0319
See application file for complete search history.

(56) References Cited

U.S. PATENT DOCUMENTS

| 137,871 A | 4/1873 | Worsley |
|---|---|---|
| 150,894 A | 5/1874 | Safely |

(Continued)

FOREIGN PATENT DOCUMENTS

| CA | 2791088 A1 | 3/2013 |
|---|---|---|
| CN | 201390486 Y | 1/2010 |

(Continued)

OTHER PUBLICATIONS

Arrows Up, Inc., Jumbo BTS—Bulk Transport System, http://www.arrowsupinc.com/product-pages/AUI_8.5x11_Jumbo_Flyer_01-2014_Final.pdf; 2014.

(Continued)

*Primary Examiner* — Andrew J Triggs
(74) *Attorney, Agent, or Firm* — Andrus Intellectual Property Law, LLP

(57) ABSTRACT

An intermodal container for transporting frac proppant, such as frac sand, and/or other types of granular material is disclosed. The intermodal container is designed to receive frac sand from a quarry or other frac sand supply source. Once the container is filled with material, the container is loaded onto a transportation device and transported to a well site. Once received at the well site, the containers can be stacked and the frac sand stored until needed. Once the frac sand is needed, the containers are placed on a base unit and the container discharges its contents onto a conveying system formed as part of the base unit. The conveying system directs the frac sand to a blending location. The empty intermodal containers can be removed from the base unit and loaded onto a transportation device to be refilled at a mine site.

18 Claims, 8 Drawing Sheets

(51) Int. Cl.
   *B65G 65/42* (2006.01)
   *B65D 88/30* (2006.01)
   *B65D 88/32* (2006.01)
   *B65D 90/58* (2006.01)
   *B65D 90/66* (2006.01)
   *B65G 15/08* (2006.01)

(52) U.S. Cl.
   CPC ........... *B65D 90/587* (2013.01); *B65D 90/66* (2013.01); *B65G 65/42* (2013.01); *B65D 2547/04* (2013.01); *B65D 2590/664* (2013.01); *B65G 15/08* (2013.01)

(56) References Cited

U.S. PATENT DOCUMENTS

| | | |
|---|---|---|
| 1,143,641 A | 6/1915 | McGregor |
| 1,807,447 A | 5/1931 | Smith |
| 1,850,000 A | 3/1932 | Dauteuil |
| 1,932,320 A | 10/1933 | Stewart et al. |
| 2,293,160 A | 8/1942 | Miller et al. |
| 2,381,103 A | 8/1945 | Briner |
| 2,603,342 A | 7/1952 | Martinson |
| 2,616,758 A | 11/1952 | Meyers |
| 2,622,771 A | 12/1952 | Tulou |
| 2,652,174 A | 9/1953 | Shea et al. |
| 2,678,145 A | 5/1954 | Juzwiak et al. |
| 2,693,282 A | 11/1954 | Sensibar |
| 2,700,574 A | 1/1955 | Tourneau |
| 2,774,515 A | 12/1956 | Johansson et al. |
| 2,791,973 A | 5/1957 | Dorey |
| 2,801,125 A | 7/1957 | Page et al. |
| 2,808,164 A | 10/1957 | Glendinning |
| 2,812,970 A | 11/1957 | Martinson |
| 2,837,369 A | 6/1958 | Stopps |
| 2,865,521 A | 12/1958 | Fisher et al. |
| 2,894,666 A | 7/1959 | Campbell, Jr. |
| 3,083,879 A | 4/1963 | Coleman |
| 3,090,527 A | 5/1963 | Rensch |
| 3,109,389 A | 11/1963 | Karlsson |
| 3,122,258 A | 2/1964 | Shile |
| 3,135,432 A | 6/1964 | McKinney |
| 3,187,684 A | 6/1965 | Ortner |
| 3,248,026 A | 4/1966 | Kemp |
| 3,255,927 A | 6/1966 | Rupert, Jr. et al. |
| 3,265,443 A | 8/1966 | Simas |
| 3,270,921 A | 9/1966 | Nadolske et al. |
| 3,281,006 A | 10/1966 | Wei |
| 3,294,306 A | 12/1966 | Areddy |
| 3,318,473 A | 5/1967 | Jones et al. |
| 3,354,918 A | 11/1967 | Coleman |
| 3,387,570 A | 6/1968 | Pulcrano et al. |
| 3,396,675 A | 8/1968 | Stevens |
| 3,397,654 A | 8/1968 | Snyder |
| 3,407,971 A | 10/1968 | Oehler |
| 3,425,599 A | 2/1969 | Sammarco et al. |
| 3,524,567 A | 8/1970 | Coleman |
| 3,596,609 A | 8/1971 | Ortner |
| 3,602,400 A * | 8/1971 | Cooke .................. B65D 88/128 222/143 |
| 3,650,567 A | 3/1972 | Danielson |
| 3,661,293 A | 5/1972 | Gerhard et al. |
| 3,692,363 A | 9/1972 | Tenebaum et al. |
| 3,704,797 A | 12/1972 | Suykens |
| 3,729,121 A | 4/1973 | Cannon |
| 3,734,215 A | 5/1973 | Smith |
| 3,738,511 A | 6/1973 | Lemon et al. |
| 3,777,909 A | 12/1973 | Rheinfrank, Jr. |
| 3,785,534 A | 1/1974 | Smith |
| 3,840,141 A | 10/1974 | Allom et al. |
| 3,854,612 A | 12/1974 | Snape |
| 3,883,005 A | 5/1975 | Stevens |
| 3,917,084 A † | 11/1975 | Swisher, Jr. |
| 3,933,100 A | 1/1976 | Dugge |
| 3,970,123 A | 7/1976 | Poulton et al. |
| 3,986,708 A | 10/1976 | Heltzel et al. |
| 3,997,089 A | 12/1976 | Clarke et al. |
| 4,003,301 A | 1/1977 | Norton |
| 4,004,700 A | 1/1977 | Empey |
| 4,057,153 A | 11/1977 | Weaver |
| 4,058,239 A | 11/1977 | Van Mill |
| 4,059,195 A | 11/1977 | MacDonald et al. |
| 4,073,410 A | 2/1978 | Melcher |
| 4,138,163 A | 2/1979 | Calvert et al. |
| 4,227,732 A | 10/1980 | Kish |
| 4,247,228 A | 1/1981 | Gray et al. |
| 4,258,953 A | 3/1981 | Johnson |
| 4,278,190 A | 7/1981 | Oory et al. |
| 4,282,988 A | 8/1981 | Hulbert, Jr. |
| 4,287,921 A | 9/1981 | Sanford |
| 4,287,997 A | 9/1981 | Rolfe et al. |
| 4,289,353 A | 9/1981 | Merritt |
| 4,329,106 A | 5/1982 | Adler |
| 4,397,406 A | 8/1983 | Croley |
| 4,398,653 A | 8/1983 | Daloisio |
| 4,428,504 A | 1/1984 | Bassett et al. |
| 4,449,861 A | 5/1984 | Saito et al. |
| 4,453,645 A | 6/1984 | Usui et al. |
| 4,475,672 A | 10/1984 | Whitehead |
| 4,483,462 A | 11/1984 | Heintz |
| 4,569,394 A | 2/1986 | Sweatman et al. |
| 4,571,143 A | 2/1986 | Hellerich |
| 4,608,931 A | 9/1986 | Ruhmann et al. |
| 4,626,155 A | 12/1986 | Hlinsky et al. |
| 4,628,825 A | 12/1986 | Taylor et al. |
| 4,660,733 A | 4/1987 | Snyder et al. |
| 4,785,966 A | 11/1988 | Waltke |
| 4,795,301 A * | 1/1989 | Snead ...................... E01B 27/04 414/339 |
| 4,819,830 A | 4/1989 | Schultz |
| 4,848,605 A | 7/1989 | Wise |
| 4,909,556 A | 3/1990 | Koskinen |
| 4,919,583 A | 4/1990 | Speakman, Jr. |
| 4,946,068 A | 8/1990 | Erickson et al. |
| 4,975,205 A | 12/1990 | Sloan |
| 4,995,522 A | 2/1991 | Barr |
| 5,080,259 A | 1/1992 | Hadley |
| 5,105,858 A | 4/1992 | Levinson |
| 5,190,182 A | 3/1993 | Copas et al. |
| 5,199,826 A | 4/1993 | Lawrence |
| 5,224,635 A | 7/1993 | Wise |
| 5,290,139 A | 3/1994 | Hedrick |
| 5,324,097 A | 6/1994 | Decap |
| 5,373,792 A | 12/1994 | Pileggi et al. |
| 5,402,915 A | 4/1995 | Hogan |
| 5,441,321 A | 8/1995 | Karpisek |
| 5,493,852 A | 2/1996 | Stewart |
| 5,538,286 A | 7/1996 | Hoff |
| 5,549,278 A | 8/1996 | Sidler |
| 5,564,599 A | 10/1996 | Barber et al. |
| 5,613,446 A | 3/1997 | DiLuigi et al. |
| 5,617,974 A | 4/1997 | Sawyer, Jr. |
| 5,647,514 A | 7/1997 | Toth et al. |
| 5,687,881 A | 11/1997 | Rouse et al. |
| 5,690,466 A | 11/1997 | Gaddis et al. |
| 5,697,535 A | 12/1997 | Coleman |
| 5,722,552 A | 3/1998 | Olson |
| 5,780,779 A | 7/1998 | Kitamura et al. |
| 5,782,524 A | 7/1998 | Heider et al. |
| 5,803,296 A | 9/1998 | Olson |
| 5,836,480 A | 11/1998 | Epp et al. |
| 5,842,619 A † | 12/1998 | Cousino |
| 5,845,799 A | 12/1998 | Deaton |
| 5,911,337 A | 6/1999 | Bedeker |
| 5,927,558 A | 7/1999 | Bruce |
| 5,971,219 A | 10/1999 | Karpisek |
| 6,006,918 A | 12/1999 | Hart |
| 6,109,486 A | 8/2000 | Lee, Jr. et al. |
| 6,120,233 A | 9/2000 | Adam |
| 6,155,175 A | 12/2000 | Rude et al. |
| 6,190,107 B1 | 2/2001 | Lanigan, Sr. et al. |
| 6,196,590 B1 | 3/2001 | Kim |
| 6,205,938 B1 | 3/2001 | Foley et al. |
| 6,247,594 B1 | 6/2001 | Garton |

(56) References Cited

U.S. PATENT DOCUMENTS

| | | |
|---|---|---|
| 6,263,803 B1 | 7/2001 | Dohr et al. |
| 6,269,849 B1 | 8/2001 | Fields, Jr. |
| 6,328,183 B1 † | 12/2001 | Coleman |
| 6,382,446 B1 | 5/2002 | Hinkle et al. |
| 6,401,983 B1 | 6/2002 | McDonald et al. |
| 6,412,422 B2 | 7/2002 | Dohr et al. |
| 6,415,909 B1 | 7/2002 | Mitchell et al. |
| 6,416,271 B1 | 7/2002 | Pigott et al. |
| 6,457,291 B2 | 10/2002 | Wick |
| 6,505,760 B1 | 1/2003 | Werner |
| 6,508,387 B1 | 1/2003 | Simon et al. |
| 6,523,482 B2 | 2/2003 | Wingate |
| 6,527,134 B2 † | 3/2003 | Hinkle |
| 6,533,122 B1 † | 3/2003 | Plunkett |
| 6,537,002 B2 | 3/2003 | Gloystein |
| 6,666,573 B2 | 12/2003 | Grassi |
| 6,772,912 B1 | 8/2004 | Schall et al. |
| 6,774,318 B2 | 8/2004 | Beal et al. |
| 6,783,032 B2 | 8/2004 | Fons |
| 6,902,061 B1 | 6/2005 | Elstone |
| 6,953,119 B1 | 10/2005 | Wening |
| 6,968,946 B2 | 11/2005 | Shuert |
| 7,008,163 B2 | 3/2006 | Russell |
| 7,051,661 B2 | 5/2006 | Herzog et al. |
| 7,104,425 B2 | 9/2006 | Le Roy |
| 7,140,516 B2 | 11/2006 | Bothor et al. |
| 7,146,914 B2 | 12/2006 | Morton et al. |
| 7,214,028 B2 | 5/2007 | Boasso et al. |
| 7,240,681 B2 | 7/2007 | Saik |
| 7,252,309 B2 | 8/2007 | Eng Soon et al. |
| 7,284,579 B2 | 10/2007 | Elgan et al. |
| 7,316,333 B2 | 1/2008 | Wegner |
| 7,367,271 B2 | 5/2008 | Early |
| 7,377,219 B2 | 5/2008 | Brandt |
| 7,475,796 B2 * | 1/2009 | Garton ............... B65D 88/128 211/153 |
| 7,500,817 B2 | 3/2009 | Furrer et al. |
| 7,513,280 B2 | 4/2009 | Brashears et al. |
| 7,591,386 B2 | 9/2009 | Hooper |
| 7,640,075 B2 | 12/2009 | Wietgrefe |
| 7,837,427 B2 | 11/2010 | Beckel et al. |
| 7,891,304 B2 | 2/2011 | Herzog et al. |
| 7,921,783 B2 | 4/2011 | Forbes et al. |
| 7,967,161 B2 | 6/2011 | Townsend |
| 7,980,803 B2 | 7/2011 | Brandstatter et al. |
| 7,997,623 B2 | 8/2011 | Williams |
| 8,083,083 B1 | 12/2011 | Mohns |
| 8,182,046 B1 † | 5/2012 | Hauth |
| 8,201,520 B2 | 6/2012 | Meritt |
| 8,379,927 B2 | 2/2013 | Taylor |
| 8,387,824 B2 | 3/2013 | Wietgrefe |
| 8,393,502 B2 | 3/2013 | Renyer et al. |
| D688,349 S | 8/2013 | Oren et al. |
| D688,350 S | 8/2013 | Oren et al. |
| D688,351 S | 8/2013 | Oren et al. |
| 8,505,780 B2 | 8/2013 | Oren |
| 8,545,148 B2 | 10/2013 | Wanek-Pusset et al. |
| 8,585,341 B1 * | 11/2013 | Oren ............... B65G 65/42 222/181.1 |
| 8,616,370 B2 | 12/2013 | Allegretti et al. |
| 8,622,251 B2 | 1/2014 | Oren |
| 8,663,371 B1 | 3/2014 | Wann |
| 8,668,430 B2 * | 3/2014 | Oren ............... B65G 65/42 414/414 |
| 8,827,118 B2 | 9/2014 | Oren |
| 8,887,914 B2 | 11/2014 | Allegretti et al. |
| 8,915,691 B2 | 12/2014 | Mintz |
| 9,052,034 B1 | 6/2015 | Wegner et al. |
| 9,248,772 B2 | 2/2016 | Oren |
| 9,296,518 B2 | 3/2016 | Oren |
| 9,403,626 B2 | 8/2016 | Oren |
| 9,511,929 B2 * | 12/2016 | Oren ............... B65D 88/32 |
| 2001/0022308 A1 | 9/2001 | Epp et al. |
| 2003/0111470 A1 | 6/2003 | Fouillet et al. |
| 2004/0065699 A1 | 4/2004 | Schoer et al. |

| | | |
|---|---|---|
| 2004/0084874 A1 | 5/2004 | McDougall et al. |
| 2006/0012183 A1 | 1/2006 | Marchiori et al. |
| 2006/0151058 A1 | 7/2006 | Salaoras et al. |
| 2006/0180062 A1 | 8/2006 | Furrer et al. |
| 2006/0180232 A1 | 8/2006 | Glewwe et al. |
| 2006/0267377 A1 | 11/2006 | Lusk et al. |
| 2008/0008562 A1 | 1/2008 | Beckel et al. |
| 2008/0022739 A1 * | 1/2008 | Aswani ............... C05F 17/0252 71/6 |
| 2008/0029546 A1 | 2/2008 | Schuld |
| 2008/0029553 A1 | 2/2008 | Culleton |
| 2008/0179054 A1 | 7/2008 | McGough et al. |
| 2008/0179324 A1 | 7/2008 | McGough et al. |
| 2008/0226434 A1 | 9/2008 | Smith et al. |
| 2008/0277423 A1 | 11/2008 | Garton |
| 2009/0038242 A1 | 2/2009 | Cope |
| 2009/0078410 A1 * | 3/2009 | Krenek ............... E21B 43/267 166/244.1 |
| 2010/0040446 A1 | 2/2010 | Renyer |
| 2010/0193077 A1 | 8/2010 | Nelson et al. |
| 2010/0278621 A1 | 11/2010 | Redekop |
| 2011/0011893 A1 * | 1/2011 | Cerny ............... B65D 88/30 222/185.1 |
| 2011/0101040 A1 | 5/2011 | Weissbrod |
| 2011/0160104 A1 | 6/2011 | Wu et al. |
| 2011/0168593 A1 | 7/2011 | Neufeld et al. |
| 2011/0297702 A1 | 12/2011 | Hildebrandt et al. |
| 2012/0009046 A1 | 1/2012 | Mauchle et al. |
| 2012/0099954 A1 | 4/2012 | Teichrob et al. |
| 2012/0103848 A1 | 5/2012 | Allegretti et al. |
| 2012/0219391 A1 | 8/2012 | Teichrob et al. |
| 2013/0004272 A1 | 1/2013 | Mintz |
| 2013/0022441 A1 | 1/2013 | Uhryn et al. |
| 2013/0161211 A1 | 6/2013 | Oren |
| 2013/0206415 A1 | 8/2013 | Sheesley |
| 2013/0209204 A1 * | 8/2013 | Sheesley ............... B65D 88/30 414/288 |
| 2014/0020765 A1 | 1/2014 | Oren |
| 2014/0023463 A1 | 1/2014 | Oren |
| 2014/0023464 A1 | 1/2014 | Oren et al. |
| 2014/0023465 A1 | 1/2014 | Oren et al. |
| 2014/0083554 A1 * | 3/2014 | Harris ............... B65D 88/32 141/1 |
| 2014/0166647 A1 | 6/2014 | Sheesley et al. |
| 2014/0305769 A1 * | 10/2014 | Eiden, III ............... B65G 65/42 198/443 |
| 2016/0031658 A1 | 2/2016 | Oren et al. |
| 2016/0280480 A1 * | 9/2016 | Smith ............... B65G 69/186 |

FOREIGN PATENT DOCUMENTS

| | | |
|---|---|---|
| DE | 4217329 A1 | 5/1993 |
| EP | 0564969 A1 | 10/1993 |
| EP | 1052194 A1 | 11/2000 |
| EP | 2311757 A1 | 4/2011 |
| GB | 1412720 | 11/1975 |
| JP | 10264882 A | 10/1998 |
| MX | 2012011046 A | 5/2013 |
| WO | 9301997 | 4/1993 |
| WO | 2007061310 A1 | 5/2007 |
| WO | 2010022308 A1 | 2/2010 |
| WO | 2013/095871 A1 | 6/2013 |
| WO | 2013/142421 A1 | 9/2013 |
| WO | 2014/018129 A1 | 1/2014 |
| WO | 2014/018236 A2 | 1/2014 |

OTHER PUBLICATIONS

Monster Tanks Inc., Sand Monster Website, http://monstertanksinc.com/sand-monster.html; 2012.

Reusable Packaging Association, Member Spotlight : John Allegretti, President & CEO, Arrows Up, Inc., http://reusables.org/2787/general/member-spotlight-john-allegretti-president-ceo-arrows-up-inc; 2013.

SeedQuest, Arrows Up, Inc. launches innovative bulk transport system for seed, http://www.arrowsupinc.com/news/SeedQuest_03-03-11.pdf; 2011.

(56) References Cited

OTHER PUBLICATIONS

Seed Today, Arrows Up, Inc. Bulk Transport System (BTS), http://www.arrowsupinc.com/news/SeedToday_03-03-11.pdf; 2011.
Solaris Oilfield Infrastructure, Mobile Sand Silo System Website, http://www.solarisoilfield.com/solaris-solutions/mobile-sand-silo-system; 2016.

\* cited by examiner
† cited by third party

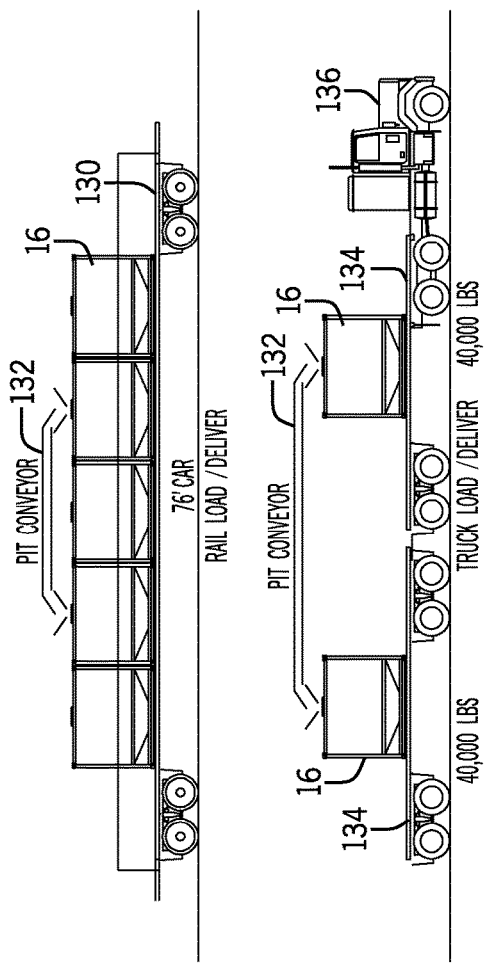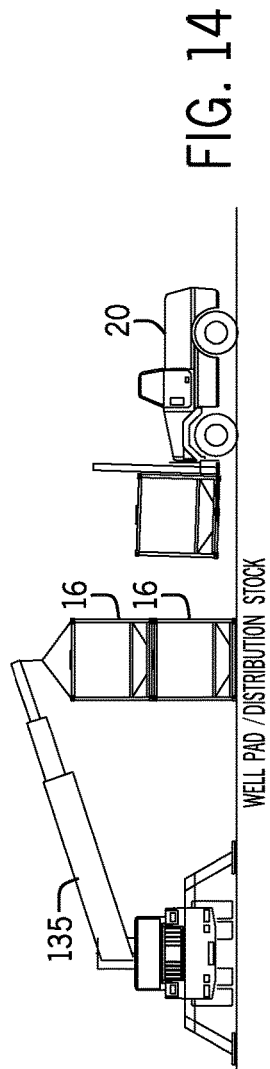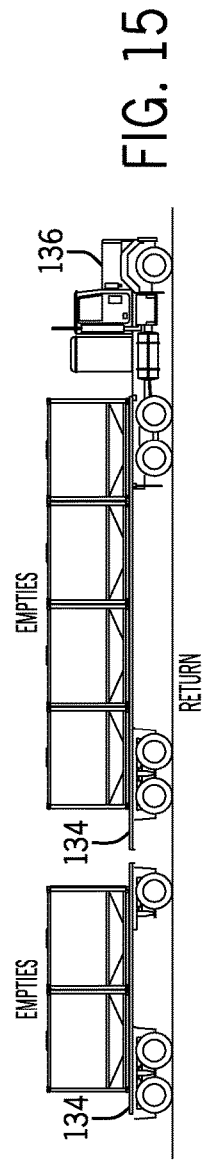

INTERMODAL STORAGE AND TRANSPORTATION CONTAINER

CROSS-REFERENCE TO RELATED APPLICATION

The present application is based on and claims priority to U.S. Provisional Patent Application Ser. No. 61/811,493 filed Apr. 12, 2013.

FIELD OF THE INVENTION

The present disclosure generally relates to an intermodal container and base unit having a conveyor for transporting, storing and distributing a frac proppant, such as sand, from a product source to a well site. The intermodal containers and base unit allow a relatively large volume of frac proppant to be stored at a transport terminal or well site and subsequently distributed for use in hydraulic fracturing (herein abbreviated "fracking").

BACKGROUND

At a fracking well site, a granular-containing fluid is pumped through a well bore and to targeted regions to create "fractures" within the underlying hydrocarbon formations. The granular material used in the mining fluid is referred to as a proppant. In many cases, the proppant is a specialized type of sand (natural, man-made or modified), referred to generally as frac sand.

Frac sand must be transported to the well site, which is often a significant distance away from the source of the fracking sand. Presently, the frac sand is trucked to the well site and discharged from the storage truck into a relatively small storage area at the well site. Since large volumes of sand and water must be continuously provided to the well site by trucks, traffic issues arise, which can interrupt the supply of either the water or frac sand. If the supply of either the water or frac sand is disturbed, such a disruption can result in the inefficient use of the well drilling equipment. If well drilling equipment is shut down because of the lack of supply of either sand or water, the cost to the well drilling company can be significant.

SUMMARY

The present disclosure relates to a system and method to provide complete proppant storage, transloading and well pad delivery within unitized intermodal containers. The system and method utilizes an intermodal container that receives a granular material, such as frac sand, from an excavation site. On the intermodal containers are loaded with frac sand, the containers may be transported to a transloading terminal using ships, rail cars or trailer trucks, or a combination of the three. When the intermodal containers are received at the well site loaded with frac sand, the containers are stacked in a storage location on or near the well site. This allows the well site operator to store sand in the same intermodal containers that were used to transport the sand to the well site.

As needed, the intermodal containers are positioned on a base unit and the contents of the intermodal container are emptied onto a conveyor belt supported below a support frame of the base unit. Each of the intermodal containers is designed such that the container can empty the entire contents of the container onto the conveyor belt within approximately five minutes.

Once the container has been emptied of its contents, the container is removed from the base unit and either returned to the storage location or placed on a transportation device, such as a trailer truck, for removal from the well site. The intermodal containers will typically be returned to the proppant source for refilling and retransportation back to the well site. The proppant source could be a mine or other locations that include a supply of the proppant, such as a terminal silo, sea port or other storage location.

The base unit that supports multiple containers allows the containers to be emptied onto a conveyor belt such that the conveyor belt can distribute the frac sand to a blending location. The base unit remains in a fixed position and the series of intermodal containers are placed on the base unit to deliver the frac sand as desired As can be understood by the above description, the same intermodal container is used to receive sand at the sand mine, transport the sand to the well site either on a rail car, ship or truck, store the sand at the well site until the contents of the container are needed and finally discharge the sand onto a conveying system. The use of a single container for initial loading, transportation, storage and discharge reduces the amount of time and transportation cost needed to deliver frac sand to a well site.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIG. 12 illustrates the positioning, of multiple containers on a rail car;

FIG. 13 illustrates the positioning of multiple containers on a trailer;

FIG. 14 illustrates the stacking of multiple containers by forklift or similar equipment;

FIG. 15 illustrates the transportation of empty intermodal containers utilizing a truck and trailer.

DETAILED DESCRIPTION

Figure 1:
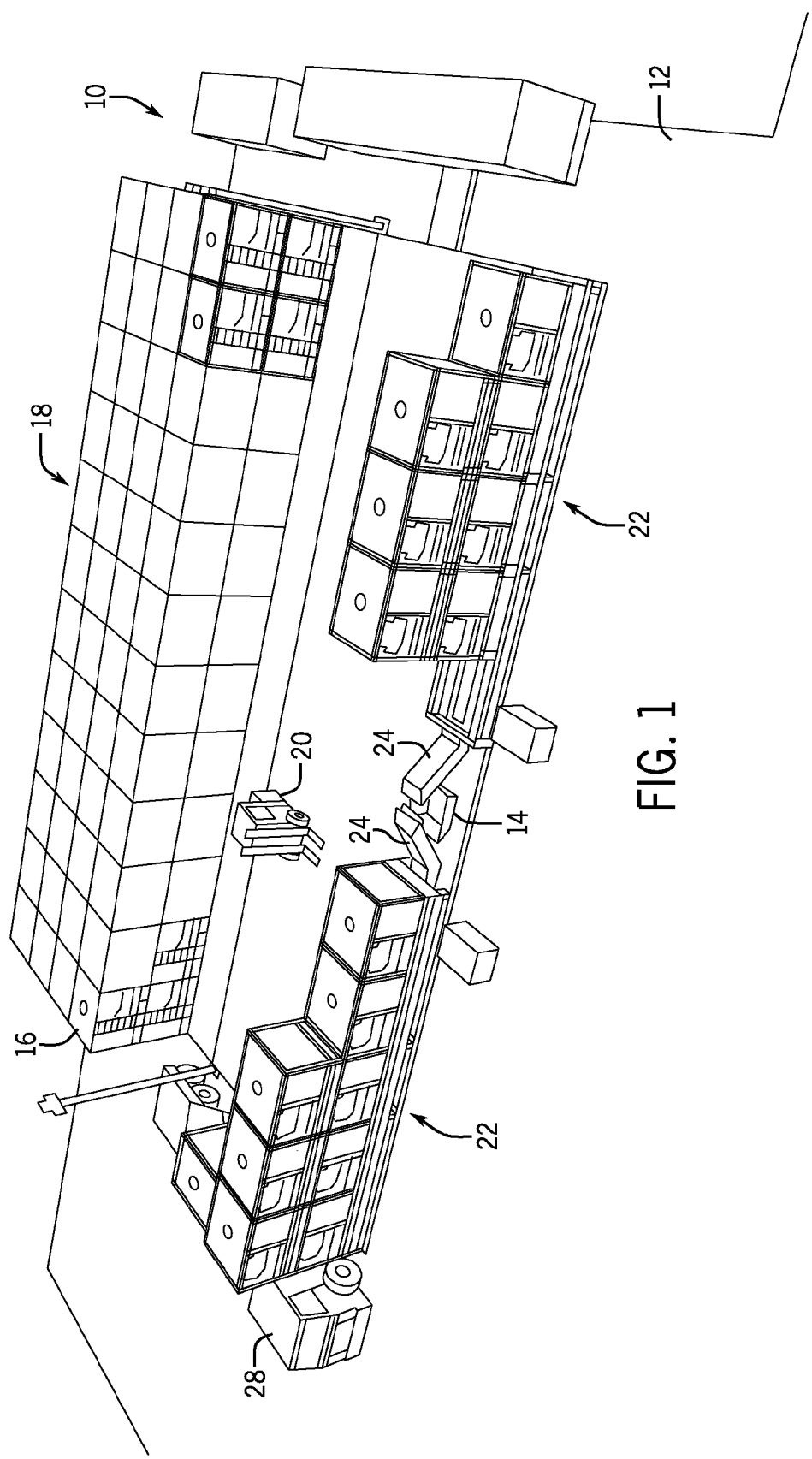
FIG. 1 is a perspective view of a well site including a storage location having a series of stacked intermodal containers and two discharging locations in which the frac sand from the intermodal containers is discharged.

FIG. 1 illustrates a well site 10 that includes a well pad 12. The well pad 12 includes a blender 14 that receives the supply of proppant, such as frac sand, which is then combined with water and distributed through the well bore to carry out the fracking process. Throughout the present disclosure, the term "frac sand" will be used to generally refer to various types of frac proppants, which may include sand, resin coated sand, ceramic sand and yet to be developed proppant materials.

In accordance with the present disclosure, a relatively large number of intermodal containers 16 can be stacked on rig mats in a storage location 18 on the well pad 12. In the embodiment shown in FIG. 1, the storage location 18 includes twelve rows of intermodal containers 16 stacked four deep and two high, which results in 96 individual intermodal containers 16 being contained at the storage location 18. A forklift 20 or other similar device can be used to transport each of the individual intermodal containers 16 from the storage location 18 to one of two discharge locations 22 also on the well pad. Each of the discharge locations 22 feeds a conveyor 24 that receives the frac sand from a base unit 26 to supply the frac sand to the blender 14. In the embodiment shown in FIG. 1, each base unit 26 is located in a fixed position and is sized to support five individual intermodal containers 16 on a first level and possibly another five intermodal containers 16 on a second level. Thus, ten of the intermodal containers 16 can be supported by each of the base units 26.

Once any one of the intermodal containers 16 has been emptied, the forklift 20 removes the container 16 from the base unit and places the empty container either back in the storage location 18 or onto the trailer/transportation truck 28. Although ninety six containers 16 are shown in the storage area 18, it should be understood that the number of storage containers contained in the storage area 18 could be expanded, depending upon the area available at the well site.

Figure 2:
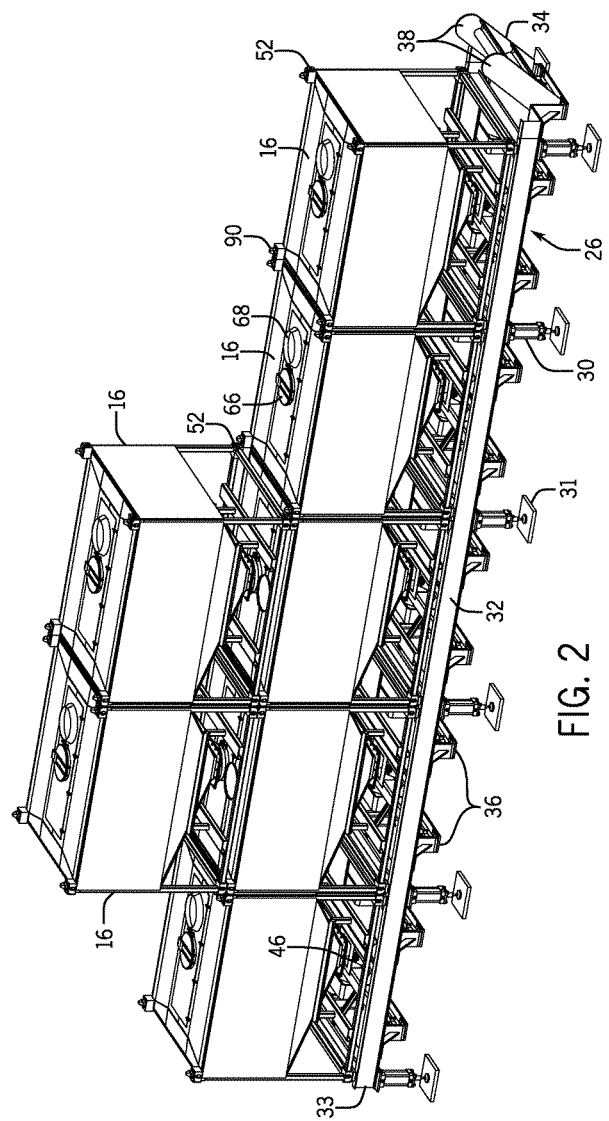
FIG. 2 is a perspective view of two rows of intermodal containers supported on a base unit including a conveyor belt.

FIG. 2 is a perspective view of the base unit 26 with seven individual intermodal containers 16 supported by the base unit 26, five in a first row and two in an upper, second row. The base unit 26 includes a series of stabilizer legs 30 that can be hydraulically adjusted to compensate for uneven ground. Each stabilizer leg 30 includes a base 31 that moves relative to a steel base 32. The base unit 26 supports an upper and lower run of a conveyor belt (not shown) to transport the discharged frac sand along the length of the base unit 26 from a first end 33 to a second, discharge end 34. The base unit 26 includes a series of lower support brackets 36 that support the upper run of the moving conveyor belt that directs the frac sand to the discharge end 34. The discharge end 34 includes a pair of support arms 38 that are angled upward to direct the flow of material to the blender, as illustrated in FIG. 1.

Referring, back to FIG. 2, the base unit 26 is shown in the illustrated embodiment as supporting five individual intermodal containers 16 on a first row and a possible five additional intermodal containers on a second, upper row. When two rows of intermodal containers 16 are stacked as shown in FIG. 2, the upper intermodal containers 16 feed material into the lower intermodal containers. The lower intermodal containers are each aligned with one of five discharge chutes 40 that are selectively controlled to discharge material from the lower intermodal container 16 onto the moving conveyor belt. Further details of the intermodal container 16 and the base unit 26 will be described in detail below.

Figure 3:
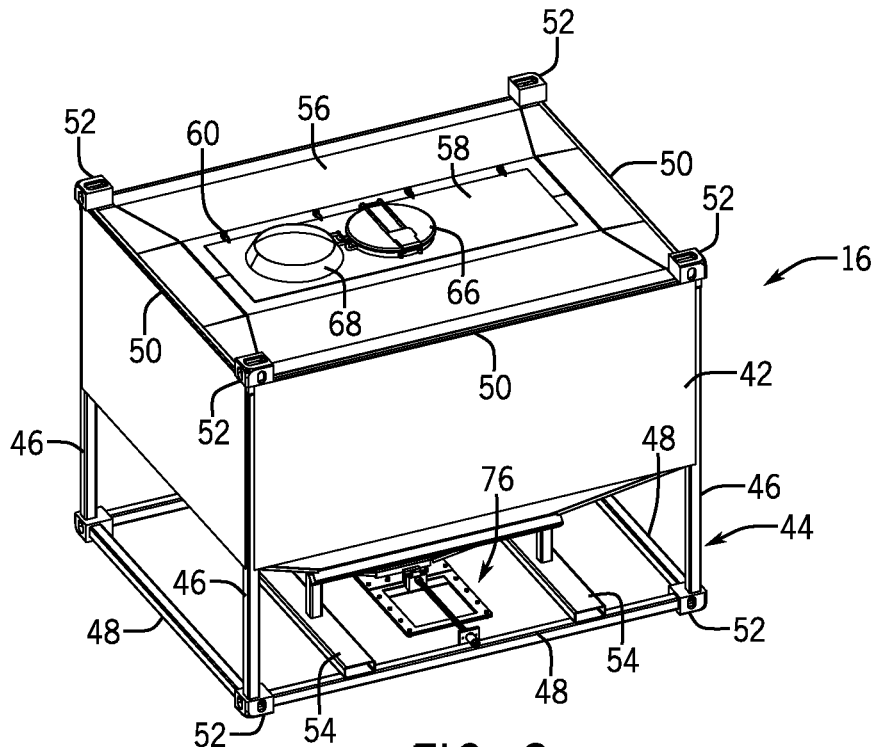
FIG. 3 is a top perspective view of one of the intermodal containers including a closed top hatch.
Figure 4:
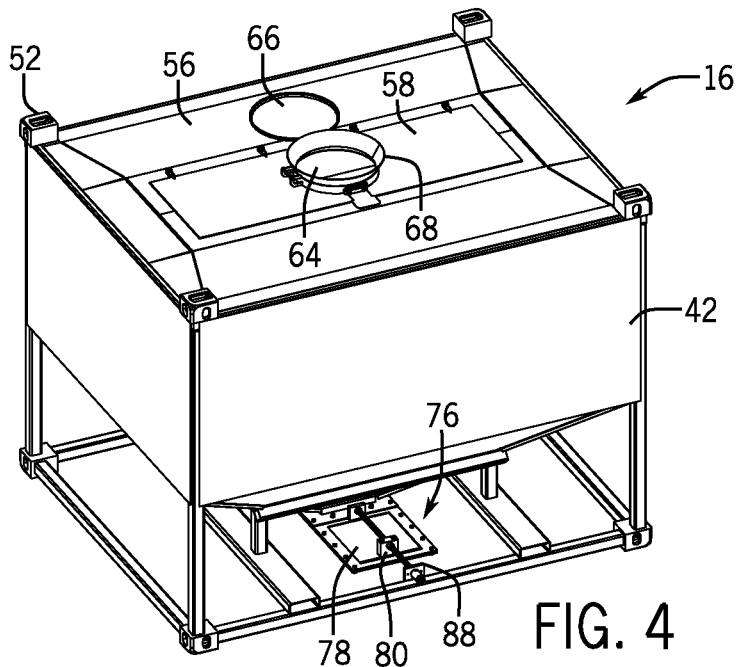
FIG. 4 is a top perspective view similar to FIG. 3 with the top hatch open.

FIGS. 3 and 4 illustrate one configuration for the intermodal container 16. The intermodal container 16 includes a storage body 42 that is formed from eleven gauge steel and supported within a support frame 44. The support frame 44 generally includes four spaced vertical posts 46 that are joined to each other at their bottom ends by a series of lower rails 48. A series of top rails 50 connect the top ends of the posts 46 to provide a stable frame for the storage body 42. As illustrated in FIGS. 3 and 4, each corner of the support frame includes an intermodal corner connector 52, which are standard components and are used to join the intermodal containers to each other and to the base unit 26 when the containers are mounted as shown in FIG. 2.

Referring back to FIGS. 3 and 4, the frame 44 further includes a pair of forklift tubes 54 that are mounted across the front and back lower rails 48. The tubes 54 are sized to receive tines of a forklift such that a forklift can be used to lift and move the entire intermodal container 16.

In the embodiment illustrated, the entire intermodal container 16 has a preferred length of ten feet, a preferred height of eight feet, and a preferred width of eight feet, which is a standard size for intermodal containers used to transport other types of materials. The container has an empty weight of approximately 3500 lbs. and a weight of fifteen tons when fully loaded with frac sand.

Figure 5:
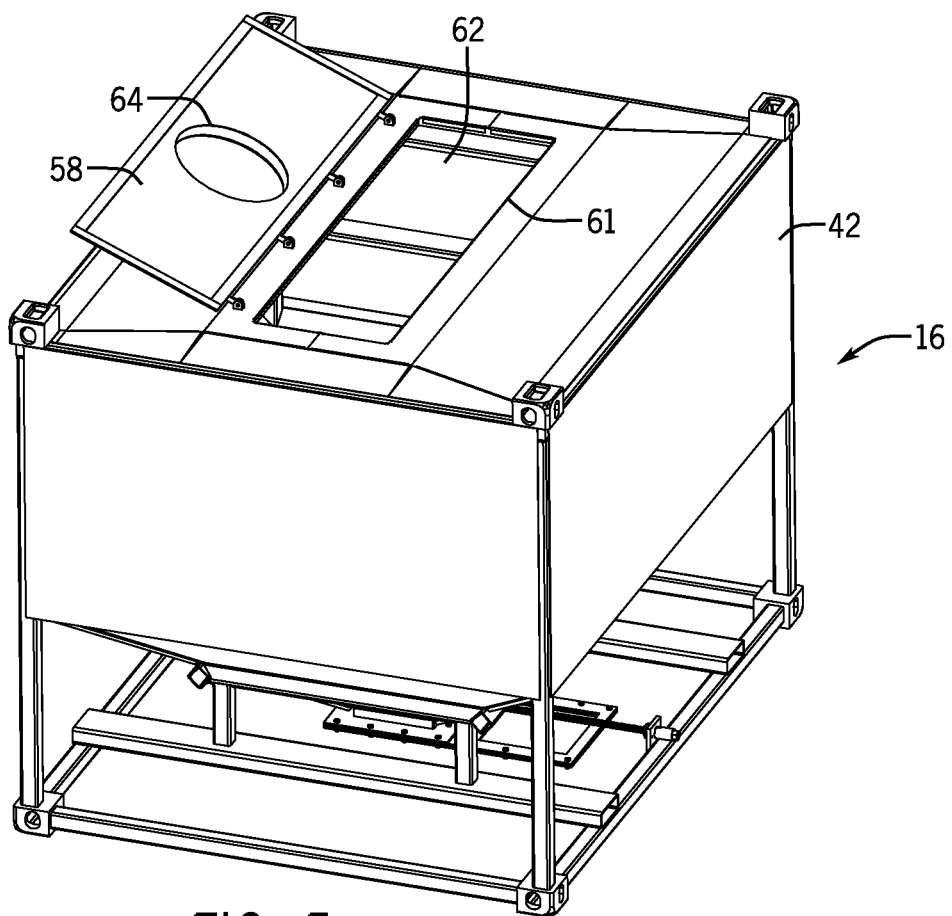
FIG. 5 is a side, top perspective view illustrating the opening of a load door for loading of the intermodal container.

As illustrated in FIGS. 3 and 4, the storage body 42 has a top wall 56 that extends between the series of top rails 50. The top wall 56 includes a load door 58 connected to the top wall by a series of hinges 60. As illustrated in FIG. 5, the load door 58 can pivot to an open position that provides access to a loading opening 61 to the storage body 42. When the load door 58 is in the position shown in FIG. 5, frac sand can be easily loaded into the open interior 62 of the storage body 42. It is contemplated that the load door 58 would be moved to this open position when the container 16 is initially loaded with frac sand.

The load door 58 includes a central opening 64 that allows material to be transferred into the storage body 42 when the load door 58 is in the closed position. The central opening could be used when initially loading the container or when transferring frac sand from an upper container positioned above a lower container. The central opening 64 has a diameter of twenty inches, although other dimensions are contemplated.

Referring back to FIGS. 3 and 4, in the embodiment illustrated, the central opening 64 of the load door 58 can receive either a top hatch 66 or a filler cone 68. When the top hatch 66 is positioned above the central opening 64, the top hatch 66 prevents material from entering into the storage body 42. In the embodiment shown in FIG. 4, the top hatch 66 is mounted to the top surface of the load door 58 by a hinge and can be pivoted to a storage position. The filler cone 68 is also mounted to the top surface of the load door 58 by another hinge and can be pivoted to its usage position in which it is aligned with the central opening 64. The filler cone 68 helps to guide material into the storage body 42, as will be described in greater detail below.

Figure 7:
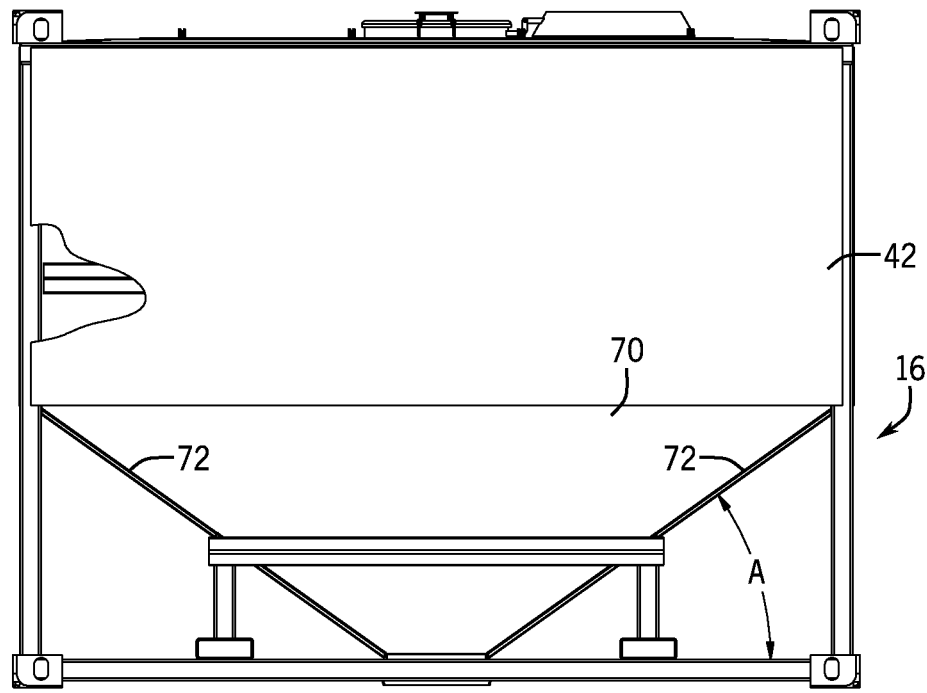
FIG. 7 is a front view of the intermodal container.
Figure 8:
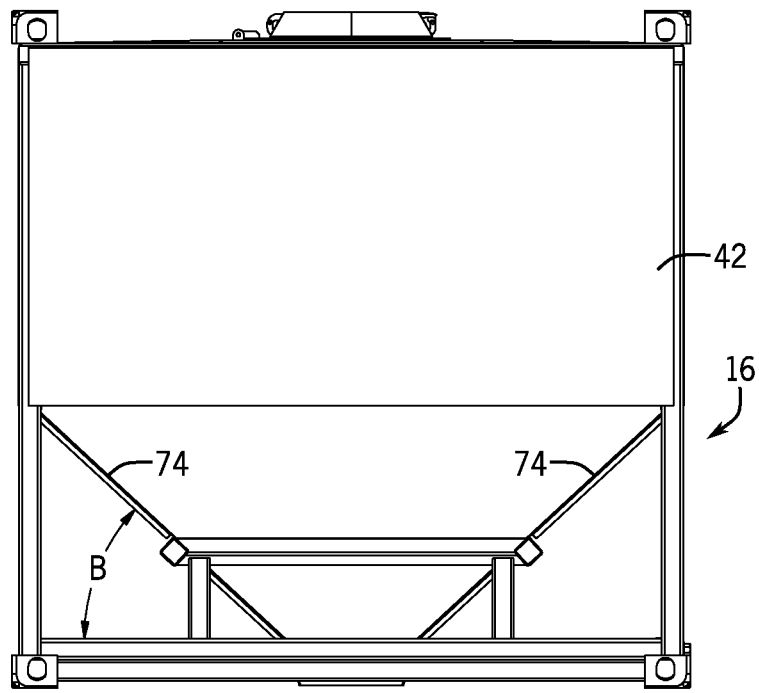
FIG. 8 is a side view of the intermodal container.

Referring now to FIGS. 7 and 8, the storage body 42 of the intermodal container 16 includes a lower discharge portion 70 that is defined by a pair of sloped end walls 72 and a pair of sloped sidewalls 74. The sloped end walls 72 and sloped sidewalls 74 are each formed from steel and meet with each other at a lower end to define a discharge opening for the container 16. The discharge opening allows frac sand to be discharged from the storage body, which is controlled by a manually operated slide gate. In the embodiment shown in FIG. 7, the sloped end walls 72 extend at an angle A of approximately 35° relative to horizontal while the sidewalls 74 shown in FIG. 8 extend at an angle B of approximately 43° relative to horizontal. The angles A and B are chosen to direct the flow of material from within the storage body to the discharge opening through only the force of gravity. The specific angles selected allow the storage body to be emptied of the entire supply of frac sand is less than five minutes.

Figure 6:
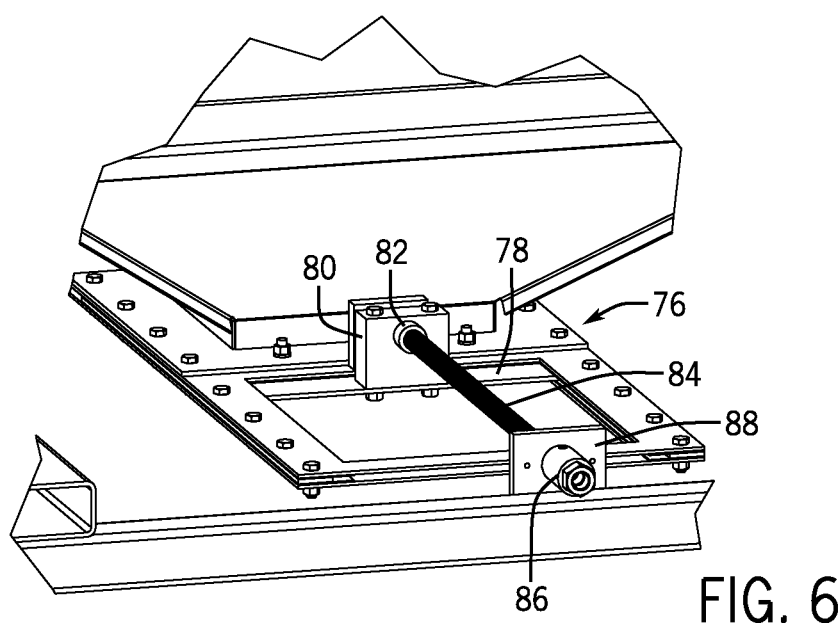
FIG. 6 is a magnified view showing the operation of the manual slide gate for the intermodal container.

Referring now to FIG. 6, the slide gate 76 is shown in its closed position. The slide gate 76 can be manually operated to move a control plate 78 between a fully open position and a fully closed position. The control plate 78 includes a moving mounting block 80 having a threaded receiving opening 82 coupled to an externally threaded control rod 84. The control rod 84 extends through a front support bracket 88 and includes a drive nut 86 that can receive a tool that can be used to manually rotate the control rod 84. As the control rod 84 rotates, the mounting block 80 moves along the length of the threaded control rod. Since the mounting block 80 is connected to the plate 78, rotation of the control rod 84 moves the plate 78 relative to the discharge opening of the intermodal container.

FIG. 3 illustrates the slide gate 76 in the closed position while FIG. 4 illustrates the slide gate 76 in the open position. In the open position, the mounting block 80 has moved toward the support bracket 88 such that the control plate 78 is moved from beneath the discharge opening of the intermodal container 16. In this manner, the slide gate 76 can be used to control the discharge of material from within the storage body 42.

Referring back to FIG. 2, after one of the intermodal containers 16 on the lower row is positioned on the base unit 26, the top hatch 66 is removed and the filler cone 68 moved into position in which it is aligned with the top opening. Once the filler cone 68 is in position, a second intermodal container can be mounted on top of the first intermodal container as illustrated. Prior to such mounting, an intermodal pin 90 is positioned in each of the corner connectors 52. The intermodal pin 90 is then received within a mating corner connector on a second intermodal container mounted to the lower intermodal container.

Once the intermodal container of the top row is positioned on top of an intermodal container of the bottom row, the slide gate for the upper intermodal container is manually opened such that material begins to discharge from the upper container into the lower intermodal container through the top opening of the lower container. If the lower intermodal container is full, the frac sand is prevented from passing from the upper row to the lower row. However, if the lower intermodal container is empty or partially full, sand begins to flow from the upper container to the lower container. In this manner, the material from the upper row of intermodal containers can be discharged into the lower row of intermodal containers for ultimate delivery from the lower container onto the conveyor belt of the base unit 26.

Figure 9:
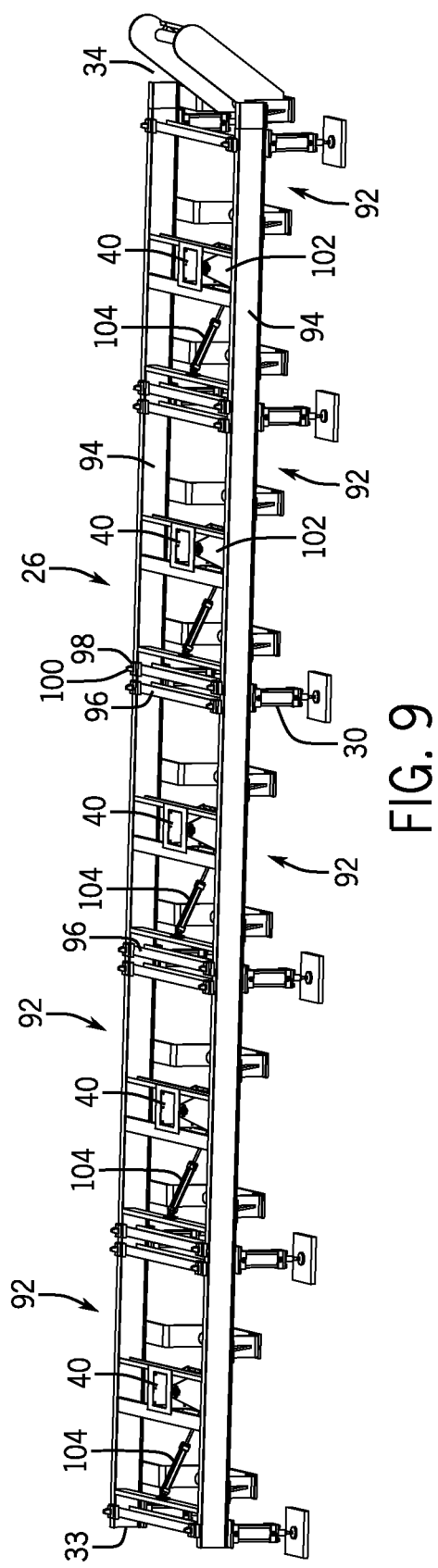
FIG. 9 is a top perspective view of the base unit.

FIG. 9 illustrates the base unit 26 of the present disclosure. As described previously, the base unit 26 supports a conveyor belt that transports the frac sand material from a first end 33 to the discharge end 34. The base unit 26 includes a pair of spaced support rails 94 connected by a series of cross supports 96. Each of the cross supports 96 includes a connector block 98 having an intermodal pin 100. The intermodal pins 100 are received within the intermodal corner connectors contained on each of the intermodal storage containers mounted to the base unit 26. In the embodiment illustrated, the base unit 26 includes five different mounting locations 92 that each include a discharge chute 40 that are each positioned between a pair of the cross supports 96. The mounting locations 92 each can receive one or more stacked containers 16, as shown in FIG. 2. Referring back to FIG. 9, the discharge chutes 40 each include a gate 102 that is selectively controlled to a user selected position between a fully closed and fully opened position. The discharge chutes 40 can thus be controlled to selectively discharge material from one of the intermodal containers when the intermodal containers are positioned above the discharge chutes, as illustrated in FIG. 2.

As shown in FIG. 9, each of the support rails 94 includes a series of stabilizer legs 30 that each can be independently hydraulically adjusted to level the base unit 26 when the base unit 26 is positioned on uneven ground.

Figure 10:
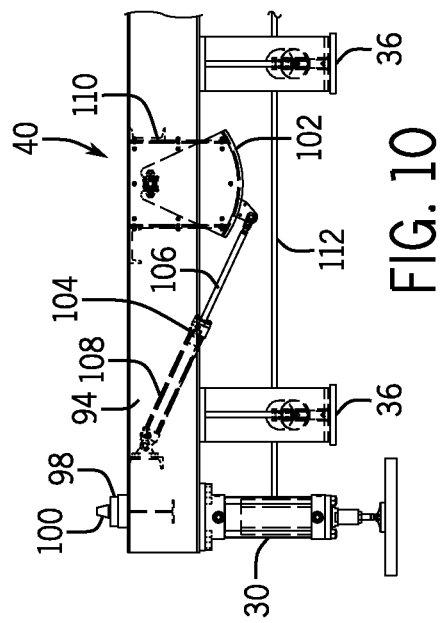
FIG. 10 is a magnified side view showing the orientation of a clam shell gate.

Referring now to FIG. 10, the discharge chute 40 includes a clam shell gate 102 that is connected to an actuator 104. In the embodiment illustrated, the actuator 104 is a hydraulic cylinder having a control rod 106 that is movable into and out of a main body 108. When the control rod 106 is retracted within the body 108, the clam shell gate 102 pivots in a clockwise direction to open the discharge chute 40 and allow material to pass through the chute 110 and fall onto the conveyor belt 112. The conveyor belt 112 is supported by a series of support brackets 36 that each extend beneath the support rail 94. Although the actuator 104 is shown as being a hydraulic cylinder, it is contemplated that the actuator 104 could be an electrical motor or similar component that is operable to move the clam shell gate 102.

When the operator wishes to supply a larger volume of sand onto the conveyor belt 112, the actuator 104 is energized which causes the clam shell gate 102 to move in a clockwise direction and supply additional sand to the conveyor belt 112. If the operator wishes to reduce the amount of material directed onto the conveyor belt 112, the actuator 104 is energized in the opposite direction to extend the control rod 106 and move the clam shell gate 102 in a counterclockwise direction until it reaches the fully closed position shown in FIG. 10.

Figure 16:
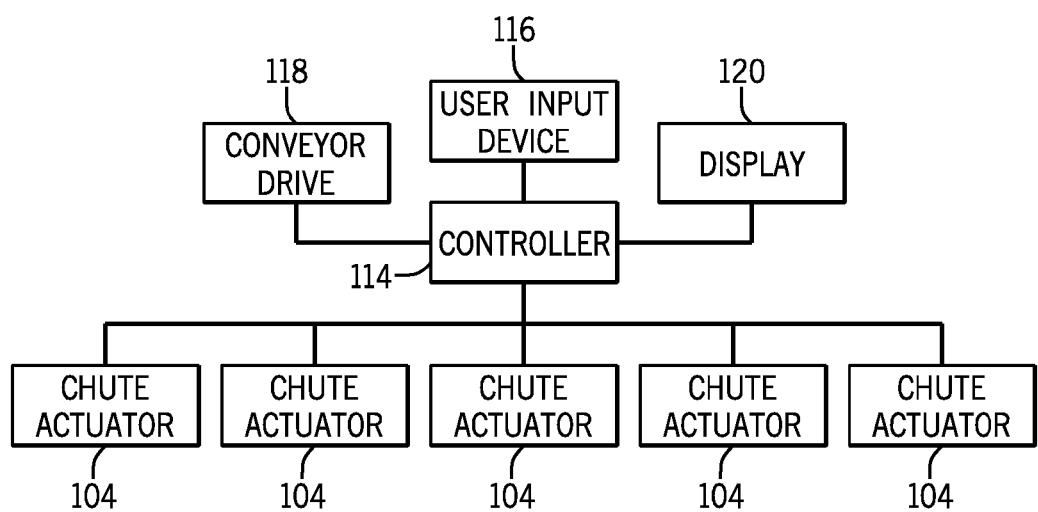
FIG. 16 is a schematic illustration of a control system for the actuators and the base unit.

As illustrated in FIG. 9, each of the discharge chutes 40 includes its own actuator 104 and clam shell gate 102. Each of the actuators 104 can be independently operated and electronically controlled by a central controller 114, as schematically illustrated in FIG. 16. The controller 114 can be mounted at any location at the well site as long as the controller is in communication with each of the actuators 104. In one embodiment, the controller is positioned in a protective housing on the base unit and is in wired communication with the actuators 104 such that the controller 114 can issue command signals to control the movement of the chute actuator in either direction. However, it is contemplated that the controller 114 could also be located remotely from the base unit and be in wireless communication with the chute actuators 104 through conventional wireless communication techniques, such as Bluetooth.

In the embodiment shown in FIG. 16, the actuator 104 is a hydraulic cylinder. It is contemplated that the controller 114 can selectively open and close electronically controlled hydraulic valves to control the flow of hydraulic fluid to the cylinder body of the actuator 104. It is contemplated that the actuator 104 could take other forms, such as an electronically actuated motor or other similar component. In either case, the controller 114 sends control signals that selectively control the movement of the actuator 104 to move the clam shell gate to open and close the discharge chute leading from the intermodal container.

As illustrated in FIG. 16, the controller is coupled to a user input device 116, such as a keyboard, such that the user can enter control commands into the controller 114. It is contemplated that the user input device 116 could take many different forms, such as a keyboard, a mobile device, such as a smartphone or tablet, or any other type of device that can communicate to the controller 114. The communication between the user input device 116 and the controller 114 can be a wired connection or a wireless connection, such as but not limited to Bluetooth. It is contemplated that if the user input device 116 is a mobile device, an operator could control the operating conditions of the base unit 26 from any location within the wireless communication range of the controller 114.

In addition to controlling each of the chute actuators 104, the controller 114 can also control the drive unit or the conveyor belt, as shown by block 118. The controller 114 can also be connected to a display 120 that visually displays the operating parameters for the entire base unit. The display 120 could be located at or near the base unit or could be part of the user input device 116.

Figure 11:
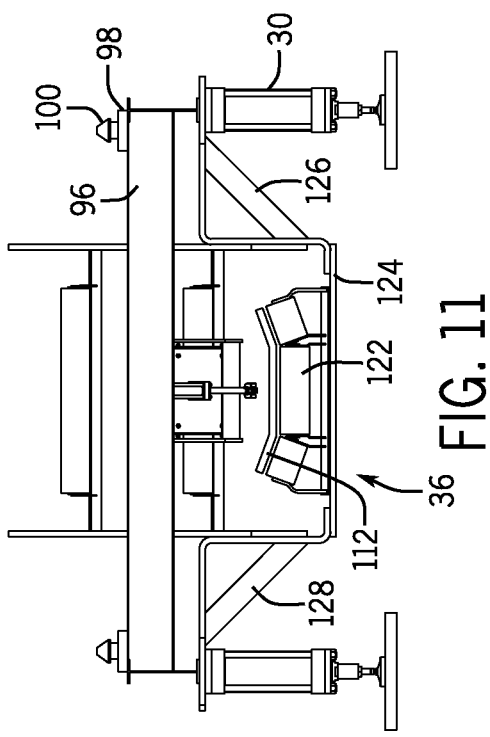
FIG. 11 is an end view of the base unit.

Referring now to FIG. 11, each of the support brackets 36 supports a series of rollers 122 that allow the lower run of the conveyor belt 112 to be supported and move along the length of the base unit. The conveyor belt 112 has a width of twenty-four niches in the illustrated embodiment. Each of the rollers 122 is mounted to a lower support plate 124, which in turn is connected to the side brackets 126. A series of braces 128 provide additional strength and stability to support the conveyor belt 112 when the conveyor belt 112 is loaded with material.

FIG. 12 illustrates the use of a rail car 130 to support five separate intermodal containers 16 for initial loading from a pit conveyor 132. The pit conveyor 132 can be located at a sand pit or other location where sand is mined and loaded for distribution.

FIG. 13 illustrates the same intermodal containers 16 mounted on one or more trailers 134 pulled by a cab 136. As in the embodiment shown in FIG. 12, each of the containers 16 can be loaded with sand from a pit conveyor 132 while supported on toe trailer 134.

FIG. 14 illustrates the use of a crane 135 that is located at the well site and used to stack the containers 16. Once the containers are empty, the crane and/or the forklift 20 can be used to load the empty containers back on the trailer or rail car. The empty containers can then be returned to the mine or loading facility on the trailers 134 pulled by the cab 136 shown in FIG. 15.

As most clearly understood in FIG. 1, the transportation, stacking, and unloading of the individual intermodal containers 16 allows a well site operator to store a large volume of sand at a well site. Once each of the individual containers 16 has been emptied, the container can be loaded onto a trailer and hauled back to the mine for reloading with frac sand. Since the intermodal containers 16 can be loaded onto conventional trailers and rail cars, the intermodal containers provide the frac proppant provider with the flexibility of utilizing, the same containers for shipping, storage and distribution of the sand at the well site. The intermodal containers are designed to be stacked in the manner illustrated in FIG. 1, and can be moved around the well site utilizing various different types of equipment, such as forklifts and cranes.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A distribution system for delivering a fracking proppant, such as sand, to a blender at a well site, comprising:
    a base unit having a pair of spaced support rails each extending from a first end to a second end, the base unit including a plurality of mounting locations;
    at least one container supported on the base unit at each of the mounting locations, wherein each container includes a support frame and a storage body supported by the support frame for holding a supply of the fracking proppant and having a discharge opening;
    a slide gate mounted to and supported on the container, wherein the slide gate is positioned beneath the discharge opening and includes a control plate and a threaded control rod, wherein rotation of the threaded control rod moves the control plate between an open position and a closed position, wherein the control plate and threaded control rod mounted to the support frame of the container and are movable with the container as the container is placed on and removed from the base unit;
    a conveyor belt supported beneath the pair of support rails and extending from the first end to the second end;
    a plurality of support rollers mounted beneath the support rails to support the conveyor belt;
    a discharge chute located in each of the mounting locations and aligned with the discharge opening of one of the storage containers when the storage containers are supported on the base unit; and
    an actuator positioned on the base unit and coupled to each of the discharge chutes to control the amount of fracking proppant delivered from the container onto the conveyor belt.

2. The distribution system of claim 1 wherein the discharge chute includes a clam shell gate coupled to the actuator, wherein the clam shell gate is movable relative to the discharge chute to control the amount of fracking proppant dispensed onto the conveyor belt.

3. The distribution system of claim 2 wherein the actuator is a hydraulic cylinder coupled to the clam shell gate.

4. The distribution system of claim 1 further comprising a controller coupled to each of the actuators such that the controller controls the discharge of the fracking proppant onto the conveyor belt at each of the mounting locations.

5. The distribution system of claim 4 further comprising a user interface device in communication with the controller.

6. The distribution system of claim 5 wherein the user interface device is in wireless communication with the controller.

7. The distribution system of claim 1 wherein the threaded control rod of the slide gate is independently operable from the actuator of the discharge chute.

8. The distribution system of claim 1 wherein the slide gate includes a mounting block, wherein the mounting block receives the threaded control rod such that rotation of the threaded control rod moves the mounting block along the control rod.

9. The distribution system of claim 8 wherein the threaded control rod includes a drive nut.

10. A distribution system for delivering a fracking proppant, such as sand, to a blender at a well site, comprising:
    a base unit having a pair of spaced support rails each extending from a first end to a second end, the base unit including a plurality of mounting locations;
    at least one container supported on the base unit at each of the mounting locations, wherein each container includes a support frame and a storage body supported by the support frame for holding a supply of the fracking proppant and having a discharge opening;

a slide gate mounted to and supported on the container, wherein the slide gate is positioned beneath the discharge opening and includes a control plate and a threaded control rod, wherein rotation of the threaded control rod moves the control plate between an open position and a closed position, wherein the control plate and threaded control rod are mounted to the support frame of the container and are movable with the container as the container is placed on and removed from the base unit;

a conveyor belt supported beneath the pair of support rails and extending from the first end to the second end;

a plurality of support rollers mounted beneath the support rails to support the conveyor belt;

a discharge chute located in each of the mounting locations and aligned with the discharge opening of one of the storage containers when the storage containers are supported on the base unit;

a clam shell gate positioned at each of the discharge chutes and selectively movable between an open position and a closed position; and an actuator coupled to each of the clam shell gates to control the amount of fracking proppant delivered from the container onto the conveyor belt.

11. The distribution system of claim 10 further comprising a controller coupled to each of the actuators such that the controller controls the position of each of the clam shell gates through operation of the actuators.

12. The distribution system of claim 11 further comprising a user interface device in communication with the controller.

13. The distribution system of claim 12 wherein the user interface device is in wireless communication with the controller.

14. The distribution system of claim 10 wherein each slide gate is selectively movable independent of the movement of the clam shell gate to selectively control the discharge of the fracking proppant from the container.

15. The distribution system of claim 14 wherein each slide gate is manually operable.

16. The distribution system of claim 10 wherein the slide gate includes a mounting block, wherein the mounting block receives the threaded control rod such that rotation of the threaded control rod moves the mounting block along the control rod.

17. The distribution system of claim 16 wherein the threaded control rod includes a drive nut.

18. A distribution system for delivering a fracking proppant, such as sand, to a blender at a well site, comprising:

a base unit having a pair of spaced support rails each extending from a first end to a second end, the base unit including a plurality of mounting locations;

at least one container supported on the base unit at each of the mounting locations, wherein each container includes a support frame and a storage body supported by the support frame for holding a supply of the fracking proppant and having a discharge opening;

a manually operable slide gate mounted to and supported on the container, wherein the slide gate is positioned beneath the discharge opening and includes a control plate, a mounting block connected to the control plate and a threaded control rod, wherein rotation of the threaded control rod moves the mounting block along the threaded control rod to move the control plate gate to a selected position between an open position and a closed position, wherein the control plate, mounting block and threaded control rod are mounted to the support frame of the container and are movable with the container as the container is placed on and removed from the base unit;

a conveyor belt supported beneath the pair of support rails and extending from the first end to the second end;

a plurality of support rollers mounted beneath the support rails to support the conveyor belt;

a discharge chute located in each of the mounting locations and aligned with the discharge opening of one of the storage containers when the storage containers are supported on the base unit;

a clam shell gate positioned at each of the discharge chutes and selectively movable between an open position and a closed position; and an actuator coupled to each of the clam shell gates to control the position of the clam shell gate to control the amount of fracking proppant delivered from the container onto the conveyor belt.

* * * * *